United States Patent
Poling et al.

(10) Patent No.: US 12,450,669 B2
(45) Date of Patent: Oct. 21, 2025

(54) PROCESS FOR SENSING-BASED CROP NUTRIENT MANAGEMENT USING LIMITING-RATE ESTIMATION AND YIELD RESPONSE PREDICTION

(71) Applicant: Sentek Systems LLC, Minneapolis, MN (US)

(72) Inventors: Bryan T. Poling, Minneapolis, MN (US); Theodore C. Poling, Eden Prairie, MN (US)

(73) Assignee: SENTEK SYSTEMS LLC, Minneapolis, MN (US)

( * ) Notice: Subject to any disclaimer, the term of this patent is extended or adjusted under 35 U.S.C. 154(b) by 1489 days.

(21) Appl. No.: 16/401,733

(22) Filed: May 2, 2019

(65) Prior Publication Data

US 2020/0349656 A1    Nov. 5, 2020

(51) Int. Cl.
  *G06Q 50/02*     (2024.01)
  *A01C 21/00*     (2006.01)
  (Continued)

(52) U.S. Cl.
  CPC ........... *G06Q 50/02* (2013.01); *A01C 21/007* (2013.01); *G06Q 10/04* (2013.01); *G06Q 10/0631* (2013.01)

(58) Field of Classification Search
  CPC .... G06Q 50/02; G06Q 10/04; G06Q 10/0631; A01C 21/007; A01B 79/005
  See application file for complete search history.

(56) References Cited

U.S. PATENT DOCUMENTS 6,393,927 B1   5/2002  Biggs et al.
6,596,996 B1   7/2003  Stone et al.
(Continued)

FOREIGN PATENT DOCUMENTS

AU   2003201383 B2   5/2004
CA      2454891 C    7/2009
(Continued)

OTHER PUBLICATIONS

Gelson et al., "Linear Response Stochastic Plateau Functions," Southern Agricultural Economics Association Annual Meetings, Mobile, Alabama, Feb. 2-5, 2003.*

(Continued)

*Primary Examiner* — Renae Feacher
(74) *Attorney, Agent, or Firm* — Merchant & Gould P.C.

(57) ABSTRACT

A sensing-based process for managing nutrient fertilization in crops. This invention uses reference plots in a field, fertilized at different pre-plant rates, including at least one plot fertilized at a lower rate than the majority of the field. Measurements from the plots are used to estimate the Current Limiting Rate (CLR), which is the lowest non-limiting nutrient rate at the time of sensing.

Preferred embodiments are presented specifically for managing nitrogen in rain-fed and irrigated corn. These embodiments use the CLR, along with a model for CLR movement with time to determine nutrient rates for mid-season treatments that achieve specified yield-based or profit-based objectives.

This invention's novel use of low-rate reference plots to estimate the CLR enable the detection of stress before the main area of a field is impacted, allowing for advance planning and intervention without sacrificing yield potential.

16 Claims, 4 Drawing Sheets

(51) Int. Cl.
G06Q 10/04 (2023.01)
G06Q 10/0631 (2023.01)

(56) References Cited

U.S. PATENT DOCUMENTS

| | | | |
|---|---|---|---|
| 6,601,341 | B2 | 8/2003 | Raun et al. |
| 6,750,898 | B1 | 6/2004 | Ishida et al. |
| 6,880,291 | B2 | 4/2005 | Raun et al. |
| 7,188,450 | B2 | 3/2007 | Raun et al. |
| 7,723,660 | B2 | 5/2010 | Holland |
| 8,520,891 | B2 | 8/2013 | Scharf et al. |
| 8,819,989 | B2 * | 9/2014 | Paternoster ............ A01N 43/12 47/58.1 SC |
| 9,195,891 | B2 | 11/2015 | Scharf et al. |
| 9,508,007 | B2 | 11/2016 | Scharf et al. |
| 9,519,861 | B1 * | 12/2016 | Gates .................... G06N 20/00 |
| 9,638,678 | B2 | 5/2017 | Shriver et al. |
| 9,652,691 | B2 | 5/2017 | Scharf et al. |
| 9,719,973 | B2 | 8/2017 | Pickett et al. |
| 10,007,640 | B2 | 6/2018 | Maidl |
| 10,096,073 | B2 | 10/2018 | Groeneveld |
| 10,154,624 | B2 | 12/2018 | Guan et al. |
| 2004/0154981 | A1 * | 8/2004 | Moutray .................... C05F 7/00 210/170.08 |
| 2004/0231239 | A1 * | 11/2004 | Raun .................... A01C 21/007 47/58.1 SC |
| 2004/0237394 | A1 * | 12/2004 | Mayfield .............. A01C 21/007 47/58.1 FV |
| 2010/0324830 | A1 | 12/2010 | Solie et al. |
| 2016/0078569 | A1 * | 3/2016 | Ethington ........ G06Q 10/06375 705/7.37 |
| 2016/0086032 | A1 * | 3/2016 | Pickett .................. G06V 20/188 382/110 |
| 2016/0180473 | A1 * | 6/2016 | Groeneveld ........... A01C 21/00 705/7.25 |
| 2017/0061052 | A1 | 3/2017 | Gates et al. |
| 2018/0049364 | A1 * | 2/2018 | Campisi-Pinto ..... A01C 21/007 |
| 2018/0146612 | A1 | 5/2018 | Sauder et al. |
| 2018/0299327 | A1 | 10/2018 | Zhao et al. |
| 2019/0150357 | A1 * | 5/2019 | Wu ........................ H04N 7/188 |
| 2019/0369609 | A1 * | 12/2019 | Takashima ............. A01G 7/045 |
| 2020/0045898 | A1 * | 2/2020 | Arriaza ................ A01C 21/007 |
| 2020/0349656 | A1 | 11/2020 | Poling et al. |

FOREIGN PATENT DOCUMENTS

| | | |
|---|---|---|
| DE | 19860306 C2 | 7/2000 |
| DE | 102012107319 B4 | 5/2014 |
| DE | 102004055217 B4 | 7/2018 |
| EP | 1419385 A1 | 5/2004 |
| WO | 2010151535 A1 | 12/2010 |
| WO | 2013087052 A1 | 6/2013 |

OTHER PUBLICATIONS

Nafziger, Dr. Emerson, "Using the Maximum Return to Nitrogen (MRTN) Recommendation System in Illinois" (Illinois NREC, Sep. 2018).*
Arnall, D.B., B.S. Tubaña, S.L. Holtz, K. Girma, and W.R. Raun. 2009. "Relationship between nitrogen use efficiency and response index in winter wheat." J. Plant Nutr. 32:502-515. doi:10.1080/01904160802679974.
Arnall, D.B., W.R. Raun, J.B. Solie, M.L. Stone, G.V. Johnson, K. Desta et al. 2006. "Relationship between coefficient of variation measured by spectral reflectance and plant density at early growth stages in winter wheat." J. Plant Nutr. 29:1983-1997. doi:10.1080/01904160600927997.
Bundy, L.G., and T.W. Andraski. 2004. Diagnostic for site-specific nitrogen recommendations for winter wheat. Agron. J. 96:608-614. doi:10.2134/agronj2004.0608.
Bushong, J.T., J.L. Mullock, E.C. Miller, W.R. Raun, A.R. Klatt, and D. B. Arnall. 2015. Development of an in-season estimate of yield potential utilizing optical crop sensors and soil moisture data for winter wheat. Prec. Agric. doi:10.1007/s11119-016-9430-4.
Ransom, Curtis J., Kitchen, Newell R., 2019 Corn nitrogen rate recommendation tools' performance across eight US midwest corn belt states. Agron. J. 2020; 1-23. doi: 10.1002/agj2.20035.
Roberts, David C., Brorsen, B. Wade, Taylor, Randal K., Solie, John B, Raun, William R., Replicability of nitrogen recommendations from ramped calibration strips in winter wheat, Precision Agric DOI 10.1007/s11119-010-9209-y, Springer Science+Business Media, LLC 2010.
Ortiz-Monasterio, J.I., and W.R. Raun. 2007. Reduced nitrogen and improved farm income for irrigated spring wheat in the Yaqui Valley, Mexico, using sensor based nitrogen management. J. Agric. Sci. 145:1-8.
Nafziger, E., Using the Maximum Return to Nitrogen (MRTN) Recommendation System in Illinois, Illinois NREC, Sep. 2018.
Franzen, D., L.K. Sharma, and H. Bu. 2014. Active optical sensor algorithms for corn yield prediction and a corn side-dress nitrogen rate aid. NDSU Circ. SF1176-5, North Dakota State Univ. Ext. Serv., Fargo.
Fuglie, K.O., and C.A. Kascak. 2015. Adoption and diffusion of natural-resource-conserving agricultural technology. Rev. Agric. Econ. 23:386-403. doi:10.1111/1467-9353.00068.
Girma, K., K.L. Martin, R.H. Anderson, D.B. Arnall, K.D. Brixey, M.A. Casillas et al. 2006. Mid-Season Prediction of Wheat Grain Yield Potential Using Plant, Soil, and Sensor Measurements. J. Plant Nutr. 29:873-897. doi:10.1080/01904160600649187.
Bijay-Singh, Ali, Ali M., Using Hand-Held Chlorophyll Meters and Canopy Reflectance Sensors for Fertilizer Nitrogen Management in Cereals in Small Farms in Developing Countries, Senors 2020, 20, 1127; doi: 10.3390/s20041127.
Arnall, D.B. Malarino, A.P. Ruark, M.D, Relationship between Grain Crop Yield Potential and Nitrogen Response, Agronomy Journal, vol. 105, Issue 5, 2013.
Mosse, J. 1990. Nitrogen-to-protein conversion factor for ten cereals and six legumes or oilseeds. A reappraisal of its definition and determination. Variation according to species and to seed protein content. J. Agric. Food Chem. 38:18-24. doi:10.1021/jf00091a004.
Mullen, R.W., K.W. Freeman, W.R. Raun, G.V. Johnson, M.L. Stone, and J.B. Solie. 2003. Identifying an in-season response index and the potential to increase wheat yield with nitrogen. Agron. J. 95:347-351. doi:10.2134/agronj2003.0347.
Peterson, T.A., T.M. Blackmer, D.D. Francis, and J.S. Schepers. 1993. Using a chlorophyll meter to improve N management. NebGuide G93-1171A. Coop. Ext. Serv., Univ. of Nebraska-Lincoln.
Raun, W.R., and G.V. Johnson. 1999. Improving nitrogen use efficiency for cereal production. Agron. J. 91:357-363. doi:10.2134/agronj1999.00021962009100030001x.
Raun, W.R., G.V. Johnson, M.L. Stone, J.B. Solie, E.V. Lukina, W.E. Thomason, and U.S. Schepers. 2001. In-season prediction of potential grain yield in winter wheat using canopy reflectance. Agron. J. 93:131-138. doi:10.2134/agronj2001.931131x.
Raun, W.R., J.B. Solie, and M.L. Stone. 2010. Independence of yield potential and crop nitrogen response. Precis. Agric. 12:508-518. doi:10.1007/s11119-010-9196-z.
Raun, W.R., J.B. Solie, G.V. Johnson, M.L. Stone, R.W. Mullen, K.W. Freeman et al. 2002. Improving nitrogen use efficiency in cereal grain production with optical sensing and variable rate application. Agron. J. 94:815-820. doi:10.2134/agronj2002.8150.
Raun, W.R., J.B. Solie, M.L. Stone, K.L. Martin, K.W. Freeman, R.W. Mullen et al. 2005. Optical sensor based algorithm for crop nitrogen fertilization. Commun. Soil Sci. Plant Anal. 36:2759-2781. doi:10.1080/00103620500303988.
Rouse, J.W., R.H. Haas, J.A. Scheel, and D.W. Deering. 1974. Monitoring vegetation systems in the Great Plains with ERTS. Proceedings, 3rd Earth Resource Technology Satellite (ERTS) Symposium, Washington, DC. vol. 1. Dec. 10-14, 1973. Goddard Space Flight Ctr., Greenbelt, MD. p. 48-62.
Sawyer, J., Nafziger, E., Randall, G., Bundy, L., Rehm, G., Joern, B., Concepts and Rationale for Regional Nitrogen Rate Guidelines for Corn, Iowa State University, University Extension, Apr. 2016.

(56) References Cited

OTHER PUBLICATIONS

Scharf, P.C., and J.A. Lory. 2009. Calibrating reflectance measurements to predict optimal sidedress nitrogen rates for corn. Agron. J. 101(3):615-625. doi:10.2134/agronj2008.011.

Scharf, P.C., D.K. Shannon, H.L. Palm, K.A. Sudduth, S.T. Drummond, N.R. Kitchen et al. 2011. Sensor-based nitrogen applications out-performed producer-chosen rates for corn in on-farm demonstrations. Agron. J. 103:1683-1691. doi:10.2134/agronj2011.0164.

Scharf, P.C., W.J. Wiebold, and J.A. Lory. 2002. Corn yield response to nitrogen fertilizer timing and deficiency level. Agron. J. 94:435-441. doi:10.2134/agronj2002.4350.

Schepers, J.S., and K.H. Holland. 2012. Evidence of dependence between crop vigor and yield. Precis. Agric. 13:276-284. doi:10.1007/s11119-012-9258-5.

Shanahan, J.F., N.R. Kitchen, W.R. Raun, and J.S. Schepers. 2008. Responsive in-season nitrogen management for cereals. Comput. Electron. Agric. 61:51-62. doi:10.1016/j.compag.2007.06.006.

Sheridan, A.H., N.R. Kitchen, K.A. Sudduth, and S.T. Drummond. 2012. Corn hybrid growth stage influence on crop reflectance sensing. Agron. J. 104:158-164. doi:10.2134/agronj2011.0213.

Solari, F., J. Shanahan, R. Ferguson, J. Schepers, and A. Gitelson. 2008. Active sensor reflectance measurements of corn nitrogen status and yield potential. Agron. J. 100:571-579. doi:10.2134/agronj2007.0244.

Solie, J.B., A.D. Monroe, W.R. Raun, and M.L. Stone. 2012. Generalized algorithm for variable nitrogen rate application in cereal grains. Agron. J. 104:378-387.

Stone, M.L., J.B. Solie, R.W. Whitney, W.R. Raun, and H.L. Lees. 1996. Sensors for detection of nitrogen in winter wheat. SAE Technical paper series. SAE Paper No. 961757. Soc. for Agric. Eng., Warrendale, PA. doi:10.4271/961757.

Tubaña, B.S., D.B. Arnall, O. Walsh, B. Chung, J.B. Solie, K. Girma, and W.R. Raun. 2008. Adjusting midseason nitrogen rate using a sensor-based optimization algorithm to increase use efficiency in corn. J. Plant Nutr. 31:1393-1419. doi:10.1080/01904160802208261.

Tubaña, B.S., D.L. Harrell, T. Walker, J. Teboh, J. Lofton, and Y. Kanke. 2012. In-season canopy reflectance-based estimation of rice yield response to nitrogen. Agron. J. 104:1604-1611. doi:10.2134/agronj2012.0214.

Raun, William R., Arnall, Brian, Edmonds, Daniel, Ramp Calibration Strip Technology for Determining Midseason Nitrogen Rates in Corn and Wheat. Agron J. 2008, vol. 100, Issue 4, DOI: 10.2134/agronj2007.0288N.

Van Es, H.M., B.D. Kay, J.J. Melkonian, and J.M. Sogbedji. 2007. Nitrogen management under maize in humid regions: Case for a dynamic approach. In: T. Bruulsema, editor, Managing crop nutrition for weather. Int. Plant Nutrition Inst. Publ. Cornell Univ., Ithaca, NY. p. 6-13.

Varvel, G.E., J.S. Schepers, and D.D. Francis. 1997. Ability for in-season correction of nitrogen deficiency in corn using chlorophyll meters. Soil Sci. Soc. Am. J. 61:1233-1239. doi:10.2136/sssaj1997.03615995006100040032x.

Hodgen, P.J., W.R. Raun, G.V. Johnson, R.K. Teal, K.W. Freeman, K.B. Brixey et al. 2005. Relationship between response indices measured in-season and at harvest in winter wheat. J. Plant Nutr. 28:221-235. doi:10.1081/PLN-200047605.

Holland, K.H., and J.S. Schepers. 2010. Derivation of a variable rate nitrogen application model for in-season fertilization of corn. Agron. J. 102:1415-1424. doi:10.2134/agronj2010.0015.

Holland, K.H., and J.S. Schepers. 2011. Active-crop sensor calibration using the virtual reference concept. In: J.V. Stafford, editor, Precision Agriculture 2011. Czech Centre for Science and Society, Prague, Czech Republic. p. 469-479.

Holland, K.H., and J.S. Schepers. 2012. Use of a virtual-reference concept to interpret active crop canopy sensor data. Precis. Agric. 14:71-85. doi:10.1007/s11119-012-9301-6.

Holland, K.H., D.W. Lamb, and J.S. Schepers. 2012. Radiometry of proximal active Optical sensors (AOS) for agricultural sensing. IEEE 5:1793-1802.

Kitchen, N.R., K.A. Sudduth, S.T. Drummond, P.C. Scharf, H.L. Palm, D.F. Roberts, and E.D. Vories. 2010. Ground-based canopy reflectance sensing for variable-rate nitrogen corn fertilization. Agron. J. 102:71-84. doi:10.2134/agronj2009.0114 Large, E.C. 1954. Growth stages in cereals. Plant Pathol. 3:128-129. doi:10.1111/j.1365-3059.1954.tb00716.x.

Lory, J.A., and P.C. Scharf. 2003. Yield goal versus delta yield for predicting fertilizer nitrogen need in corn. Agron. J. 95:994-999. doi:10.2134/agronj2003.0994.

Lukina, E.V., K.W. Freeman, K.J. Wynn, W.E. Thomason, R.W. Mullen, A.R. Klatt et al. 2001. Nitrogen fertilization optimization algorithm based on in-season estimates of yield and plant nitrogen uptake. J. Plant Nutr. 24:885-898. doi:10.1081/PLN-100103780.

\* cited by examiner

PROCESS FOR SENSING-BASED CROP NUTRIENT MANAGEMENT USING LIMITING-RATE ESTIMATION AND YIELD RESPONSE PREDICTION

TECHNICAL FIELD

This invention relates to nutrient fertilizer management in crops using local and/or remote sensing. Embodiments apply to irrigated and non-irrigated crops, and support profit-based and yield-based objectives.

BACKGROUND

The field of precision agriculture aims to sense and manage variability in soil and crop growing conditions. The goal is better management of farm inputs by detecting, locating, and identifying important factors such as nutrient deficiencies, weed densities, pest infestations, and crop water status, and responding to these problems quickly and effectively to protect crop yields. This enables the application of farm inputs including fertilizers, herbicides, fungicides, larvicides, pesticides and water at the right locations, times, and rates to optimize growers' profits and reduce environmental impact.

One specific challenge in precision agriculture is determining the right amounts and locations to apply nutrient fertilizers in order to achieve a particular goal. A modern approach to this problem takes an economic viewpoint and aims to maximize a grower's profit. In this treatment, we consider the management of a single nutrient and we define $N_r$ to be the season-total application rate for this nutrient in mass per unit area (e.g. lbs/acre). Let $P(N_r)$ denote the profit per acre, as a function of the applied nutrient rate. This function is defined by the profit equation:

$$P(N_r) = Y(N_r)P_c - N_r C_N \quad (1)$$

In equation (1), $N_r$ is the applied nutrient rate in mass per unit area (e.g. lbs/acre). $Y(N_r)$ is the yield achieved when rate $N_r$ is applied. This is an amount of harvested product per unit area (e.g. bushels/acre for corn). $Y(N_r)$ is known as the Yield Response To Nutrient (YRTN) function. $P_c$ is the sale price of the crop (e.g. $/bushel for corn), and $C_N$ is the cost of the nutrient (e.g. $/lb). The units of measurement can vary in (1) so long as they are compatible.

A grower generally has very good estimates of their economic parameters $C_N$ and $P_c$. However, a grower does not generally have a good estimate of the crops YRTN function, $Y(N_r)$. If a grower knew this function precisely, all terms on the right side of equation (1) would be known and the profit could be plotted for each nutrient rate $N_r$. The nutrient rate $N_r$ which maximizes the grower's profit $P(N_r)$ could be identified and the problem of nutrient management would be solved. Therefore, the problem of nutrient management reduces to the problem of estimating the YRTN function $Y(N_r)$.

Crop nutrient management is difficult because the YRTN curve $Y(N_r)$ can be influenced by many complex factors which vary from season-to-season and from field-to-field. For example, the YRTN curve for nitrogen management in corn is influenced by factors such as:

Precipitation amount and timing
Temperature
Soil type, texture, and structure
Soil Organic Matter (OM) and bacteria/microorganism content
Soil enzymes and pH
Type and timing of fertilizer applications
Volatilization
Ground slope
Erosion and runoff
Leaching
Denitrification
Organic immobilization
Mineralization
Nitrification Climate change is also contributing to greater seasonal variability in precipitation and temperature patterns which can further increase annual deviations of seasonal YRTN curves from the historical average.

There have been efforts to model and predict the complex factors impacting the YRTN function. For some combinations of crops and nutrients the factors impacting this function are less complex and more predictable than in our example above, making predictive modeling a viable option. However, for nutrients such as nitrogen, the processes impacting the YRTN function tend to be highly localized, interdependent, and often highly nonlinear, making their accurate prediction challenging, if not impossible. Consequently, recommended best management practices (BMPs) for nitrogen management in corn in the states of IA, MI, MN, IL, WI, and OH rely on YRTN curves that are found by averaging yield response curves from corn nitrogen trials conducted across their respective states. Over 1,000 trials have been conducted to build the database from which these averages are derived, covering corn-following-corn and corn-following-soybean rotations. The BMP recommends using the average YRTN curve for your area to predict and fertilize at the rate that is expected to be economically optimal. This practice is called the Maximum Return to Nitrogen (MRTN) method. A clear description of this method by Emerson Nafziger is available in "Using the Maximum Return to Nitrogen (MRTN) Recommendation System in Illinois" (Illinois NREC, September 2018).

The average YRTN function used in the MRTN method is a good initial estimate of the YRTN for a particular field and season. Unfortunately, since there can be such large differences in this function across fields and seasons, using a method that doesn't adjust for this variability (like the MRTN method) often results in significant lost profit.

Multiple different methods have been developed to use in-season measurements such as sensor readings on reference areas, soil tests, or weather data to account for season-to-season and field-to-field variability. These methods promise to better estimate the nutrient rate that achieves a specified goal (e.g. achieving maximum yield or profit), and also to decrease the probability that a grower will overfertilize. By applying amounts of fertilizer closer to that required by the crop the amount of excess chemicals applied to grower's fields is minimized. Excess chemicals can leach into ponds, streams, rivers, aquifers, and the ocean causing severe environmental damage. They can contaminate drinking water, kill marine life, and cause algal blooms and eutrophication. Thus, such methods aim not only to improve a growers profitability or to achieve a specific yield goal, but also to protect the environment.

SUMMARY

The present invention provides a method for determining in-season nutrient fertilizer application for crops based on sensor readings of crop health or vigor. To use this method, one creates a collection of reference plots in a field that are fertilized at or before planting at different rates from the rest of the field. Later, when the crop has reached an appropriate growth stage, crop health or vigor measurements are made from these reference plots and a Vegetation Index (VI) is computed. There are many ways crop health or vigor can be sensed and VIs can be defined, but in some embodiments the VI will be derived from canopy reflectance measurements in one or more different spectral bands. More specifically, and by way of example, some embodiments of this invention use the Red Normalized Difference Vegetation Index (Red NDVI). Denote canopy reflectance in the red band (approximately 625-740 nm wavelength) with $R_{Red}$ and canopy reflectance approximately in the region 800-1000 nm as $R_{NIR}$. Then the Red NDVI index is defined as follows:

$$NDVI = \frac{R_{NIR} - R_{Red}}{R_{NIR} + R_{Red}} \quad (2)$$

Note that our discussion of Red NDVI is not meant to limit the scope of the invention, but is merely provided as an example because this index is known to reveal nutrient stress in many crops due to certain nutrient deficiencies (nitrogen in particular). We also point out that while equation (2) involves canopy reflectance measurements, there are many variations in how such indices are actually computed, and in practice it is quite common to use measurements that are proxies for canopy reflectance. For instance, one can use multi-spectral aerial imagery and compute spectral irradiance over an area of crop. This might be used in conjunction with an incident light sensor, measurements from reflectance panels, or prior measurements of insolation to estimate reflectances, and then compute an approximate vegetation index using these estimates. To mitigate some of the error introduced through such approximations, sometimes "relative" indices are used, which are ratios of an index measured on a given area in a field divided by the same index measured in a specific, fixed location in the field (a location often chosen or managed so that the given nutrient is not limiting growth). More generally, a vegetation index, as we define it, does not even need to be based on canopy reflectance. It is just some sensor-based reading of the crop that is indicative of crop health or vigor. Other examples include crop biomass, leaf area index (LAI), crop density, percent canopy cover, canopy closure rate, or crop height. Variations in the definition of an index, the platforms or sensors used to collect data (e.g. ground-based, airborne, or satellite-based multi or hyper-spectral sensing), or the means by which it is computed are not significant innovations and should not distinguish a substantially similar method from the current invention. We will henceforth refer to the chosen index as the VI (Vegetation Index). It should be understood that in different embodiments this VI could be Red NDVI or any other index that is sensitive to plant health or stress due to a given nutrient, and it may be a relative index or an absolute index (not relative). Without loss of generality we assume that the chosen VI is positively correlated with plant health/vigor. If the preferred VI is negatively correlated with health, one can simply multiply it by −1 to create an index that is positively correlated with plant health.

With VI measurements from the reference plots, an Index Response To Nutrient (IRTN) function is estimated. This is a function mapping applied nutrient rates to corresponding VI values. The measurements from the reference plots should ideally satisfy this function. However, it is understood that measurements and applied rates in real-world situations are noisy and so they may only approximately satisfy this function. Thus, in practice, a simple and reasonable function form is selected and then fit to the data points corresponding to the reference plots. In the preferred embodiments the form of this function is the quadratic plateau. The quadratic plateau function is defined as follows:

$$f(x) = \begin{cases} ax^2 + bx + c & \text{if } x < k \\ d & \text{if } x \geq k \end{cases} \quad (3)$$

This definition was chosen for simplicity, but we have the additional requirements: $d = ak^2 + bk + c$, and $b = -2ak$, to ensure the function is continuous and has continuous first derivative. The exact form of the function is not important and many other forms could serve equally well. The important properties are that the function is continuous, weakly positive monotonic ($x_1 > x_2$ implies $f(x_1) \geq f(x_2)$), and has a plateau ($f(x)$ is constant for large enough x). Different forms for the IRTN function do not represent significant innovations over the present invention. Estimating the IRTN function, or "fitting" the IRTN curve to the reference plot data, in the preferred embodiment, means finding the coefficients a, b, c, d, and k such that the points corresponding to the reference plots approximately satisfy the function $f(x)$. There are many well-known options for fitting a curve such as this, including minimizing mean-square error (MSE), minimizing total absolute error ($\ell_1$ error), or minimizing a weighted mean-square error function. The chosen fitting method is not especially important and changing it would not constitute a significant innovation over the present invention. Once the IRTN function has been estimated, the input at which the function plateaus is identified. This is the lowest t for which $f(x)$ is constant for $x \geq t$. In the preferred embodiment, the plateau equals k, but if a different function form is used it would need to be computed differently. The nutrient rate corresponding to the plateau will be referred to as the Current Limiting Rate (CLR) for the nutrient; that is, the CLR is the lowest nutrient rate achieving the maximum value of the IRTN function. The chief purpose of estimating the IRTN function is to identify the CLR. We note that it is possible to estimate the CLR directly (albeit more crudely) from the VI measurements on the reference plots without fitting a function to that data. For instance, one could just take the rate of the lowest-rate plot for which the VI is within 99% of the VI of the highest-rate plot. Such a trivial modification should not serve to distinguish a substantially similar method from the current invention.

While we precisely defined the CLR above, it deserves some motivation. There has been a great deal of work in using VI measurements to directly come up with nutrient prescriptions or to predict yield and use those predictions to generate prescriptions and several patents have been granted. However, using VI measurements directly is fraught with challenges. Differences in sensor spectral sensitivity characteristics, measurement technology (particularly active v.s. passive sensing), and sensing conditions mean that different sensors can return different VI readings on the same crop. The same sensor can even give different readings depending on the time of day or the lighting and weather conditions. Relative VIs can mitigate some of this variability, but they can't combat two more fundamental problems: (1) The relationship between VI and stress level, nutrient sufficiency, or yield can depend significantly on the specific plant breed or hybrid being grown, and (2) VI's cannot generally distinguish stress caused by a particular nutrient deficiency from other forms of stress. Using the above-described method to estimate CLR, we identify the nutrient rate at which that particular nutrient becomes a limiting factor in crop growth or vigor (at least in terms of its visible manifestation in the plant). That is, at any rate above the CLR there is no visible improvement in the crop, and any rate below the CLR will manifest in some degradation in vigor. While the CLR can (and generally does) change with time, it's instantaneous value is meaningful and indicative of crop nutrient status, while simultaneously being robust to variability in virtually all external conditions. One can change sensors, sensing conditions, sensing technologies, or even completely change the VI being used to quantify crop vigor, and the CLR is virtually unaffected. Therefore, use of the CLR promises substantial improvements over other methods, and it represents one of the key innovations of the current invention.

As a general rule, the CLR starts at 0 when a crop is planted and increases as the growing season progresses. This intuitive result simply means that as the crop grows and extracts more and more of the nutrients from the soil, it will take higher application rates to ensure that a given nutrient is not limiting growth. We have found that at least in some crops and nutrients (corn and nitrogen in particular) the movement of the CLR is highly linear and predictable with time.

There are many ways in which the CLR can be exploited for the purpose of nutrient management, and we present multiple strategies as part of this invention. First, we define some terminology. A critical quantity for nutrient management is the Max Yield Rate (MYR). This is the lowest season-total nutrient rate for which a crop achieves the maximum possible yield. If a crop is fertilized at a rate above the MYR, the amount in excess of the MYR is completely wasted as it results in no increase in crop yield. In many management practices, the goal is to apply as close to the MYR as possible. This is not generally optimal from an economic standpoint, however. The economically optimal nutrient rate is slightly less than the MYR, as extra nutrients offer diminishing returns with respect to yield as you approach the MYR. To identify the economically optimal nutrient rate, the Yield Response To Nutrient (YRTN) function must be known. This maps each nutrient rate to the corresponding crop yield that would be achieved with that rate. With this curve, the cost of a nutrient ($/lb) and the price of the harvested crop ($/bu) can be used to compute the profit corresponding to each nutrient rate. The rate that achieves maximum profit is called the Economically Optimal Nutrient Rate (EONR). Regardless of whether the goal is to hit the EONR, the MYR, or some similar objective, the amount to fertilize required is completely governed by the YRTN function. In this sense, all nutrient management strategies can be seen as different approaches to predicting the YRTN function, although many strategies make no explicit mention of it.

A nutrient management strategy built around the CLR takes a collection of inputs, including a measurement of the CLR and crop growth stage, predicts the YRTN function (possibly implicitly), and uses it to design one or more mid-season nutrient treatments. In some embodiments, this is done a single time mid-season and used to compute the best rate to achieve a particular goal (e.g. achieving maximum yield or maximum profit). A mid-season fertilizer application is then executed to bring the season-total applied nutrient rate up to this target rate. In other embodiments the fertilizer is applied in many small, periodic doses (e.g. through irrigation equipment). In this case, the CLR is measured several times throughout the season and the YRTN prediction and corresponding target rate is continually updated. The sizes of the nutrient doses are adjusted after each update to make sure a field is on track to achieving the final target rate. We detail preferred embodiments representing examples of each strategy below.

There is a longstanding problem with previous sensing-based nutrient management technologies. It stems from the fact that the differences between a non-nutrient-limited plant and a plant that is just slightly nutrient limited are extremely subtle. Consequently, nutrient deficiencies are often not directly observed until the crop is moderately or severely deficient. In previous methodologies, such a deficiency is only addressed once it is detected in a deficient area, and it is well understood that even with adequate intervention some yield potential can be lost due to the period of nutrient deficiency. This issue is the driving force in the continual search for sensing technologies and VIs that are ever more sensitive to crop nutrient status. Additionally, a practitioner of one of these previous methods must be diligent in monitoring a field with high frequency to make sure deficiencies are spotted as quickly as possible to minimize the period of deficiency; even still, some loss of yield potential will occur. This is even a problem in the better sensing-based management strategies. In particular, Raun et al. describe in "Ramp Calibration Strip Technology for Determining Mid-season Nitrogen Rates in Corn and Wheat" (Agronomy Journal, July 2008) a technique that is likely most similar to certain embodiments of this invention than any other described in literature and patents. They measure a reflectance-based VI (Red NDVI) on a collection of reference plots and identify a value similar to, but not as general as, the CLR (which they describe as the point where the "transition curve reaches the plateau"). However, in their methodology, all reference plots are fertilized at rates above the rate used outside the reference areas, meaning that by the time they are able to measure a nutrient response, the majority of the field is already under stress and losing yield potential.

The present invention solves this problem. Let the area outside the reference plots be referred to as the bulk area, and let the rate used in that area be called the bulk rate. This invention's use of reference plots that are fertilized below the bulk rate makes it possible to see nutrient stress coming before the bulk area of a field is impacted. Other methods can distinguish between different levels of nutrient deficiency, but cannot distinguish between non-nutrient limited areas, even if there are large differences in the available nutrients in those areas. The present invention's novel use of multiple reference plots (including plots fertilized below the bulk rate) to compute the CLR allows one to see how much more fertilizer is available in the bulk area than the amount that would be limiting to the crop, even when no stress is visible in the bulk area. This allows nutrient treatments to be created and applied before the bulk area ever becomes nutrient limited, avoiding any loss in yield potential. This is the first sensing-based nutrient management system to achieve this.

A further benefit of this invention is the ability to measure yield in each reference plot at harvest and compute the true YRTN function and the true EONR for the season. By comparing the predicted YRTN curve and EONR to the end-of-season, true YRTN curve and EONR the grower can evaluate the performance of their management decisions. Specifically, the grower can determine their yield and profit for the growing season and compare it to the maximum yield and profit that was possible in that season. In order for a grower to know with certainty how well they performed relative to the maximum attainable profit or yield in a growing season, reference plots with different nutrient rates are essential. Without them a grower cannot measure the true YRTN function or true EONR to compare with their nutrient prescriptions. Any nutrient management method without reference plots cannot be checked for accuracy.

In the first preferred embodiment, the CLR is used, along with a model for CLR movement with time and additional information to predict the crop yield corresponding to different application rates. Then, one or a small number of mid-season applications are designed that will achieve a specified goal (maximizing profit or minimizing applied nutrients while achieving maximum yield) for the field.

In a second preferred embodiment, the CLR is used, along with a model for CLR movement with time and additional information to compute a fertigation rate for use in irrigated crops. Sensing and rate evaluation are repeated periodically and the rate is computed to achieve maximum yield without overapplying nutrient fertilizer. In a third preferred embodiment, the CLR is used as in the second embodiment but the rate is computed to achieve maximum profit for the area.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
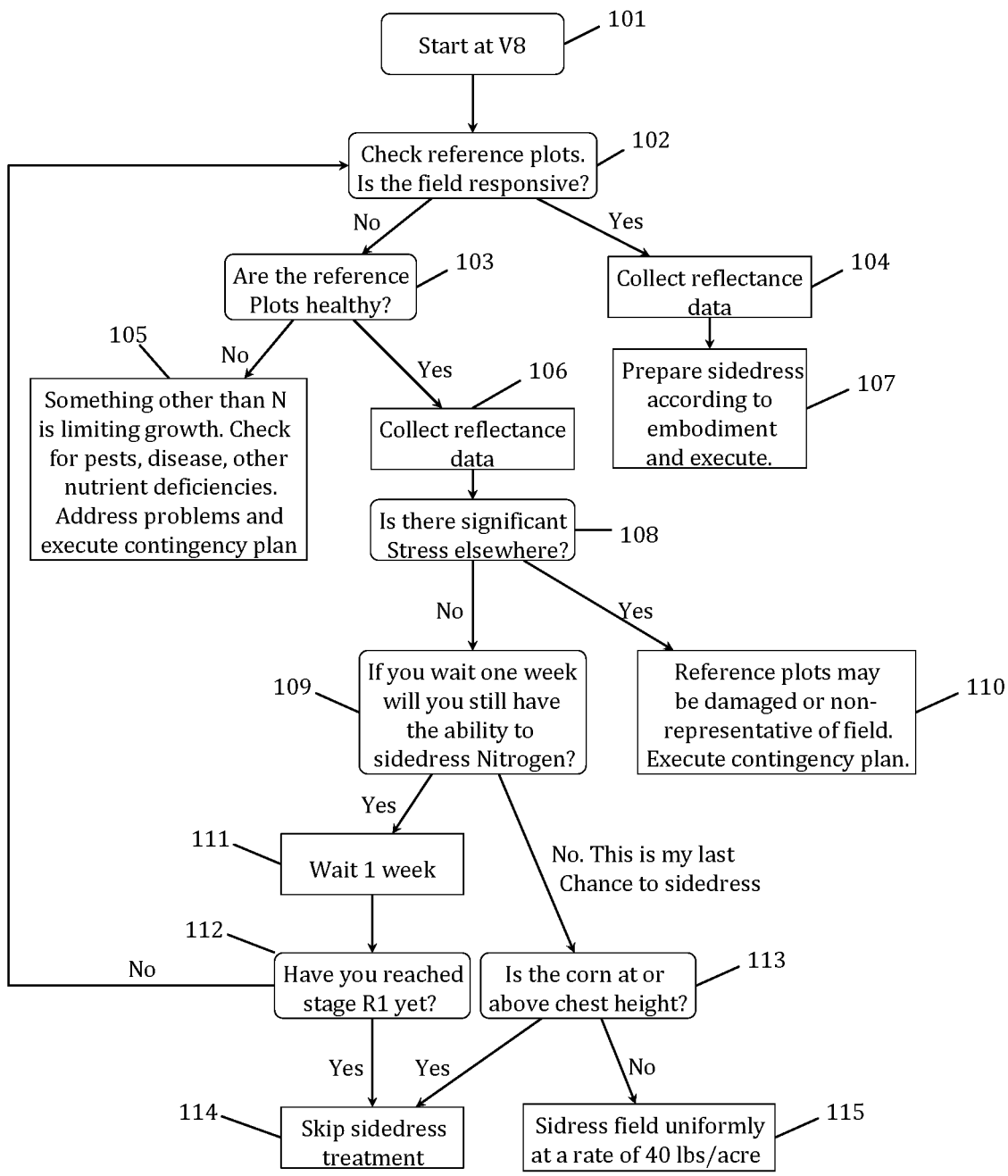
FIG. 1 is a flowchart illustrating the preferred embodiment of the invention for managing nitrogen in non-irrigated corn.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

A Preferred Embodiment for Nitrogen Management in Non-Irrigated Corn

The arrangement in FIG. 1 illustrates a preferred embodiment of this invention specialized for managing nitrogen in corn using a single mid-season application (in addition to the fertilizer applied at or before planting). This is the preferred embodiment for managing nitrogen in non-irrigated (also called "rain-fed") corn. This embodiment can be used at a field level or it can be used in individual management zones within a field (e.g. corresponding to areas with different soil types).

Figure 2:
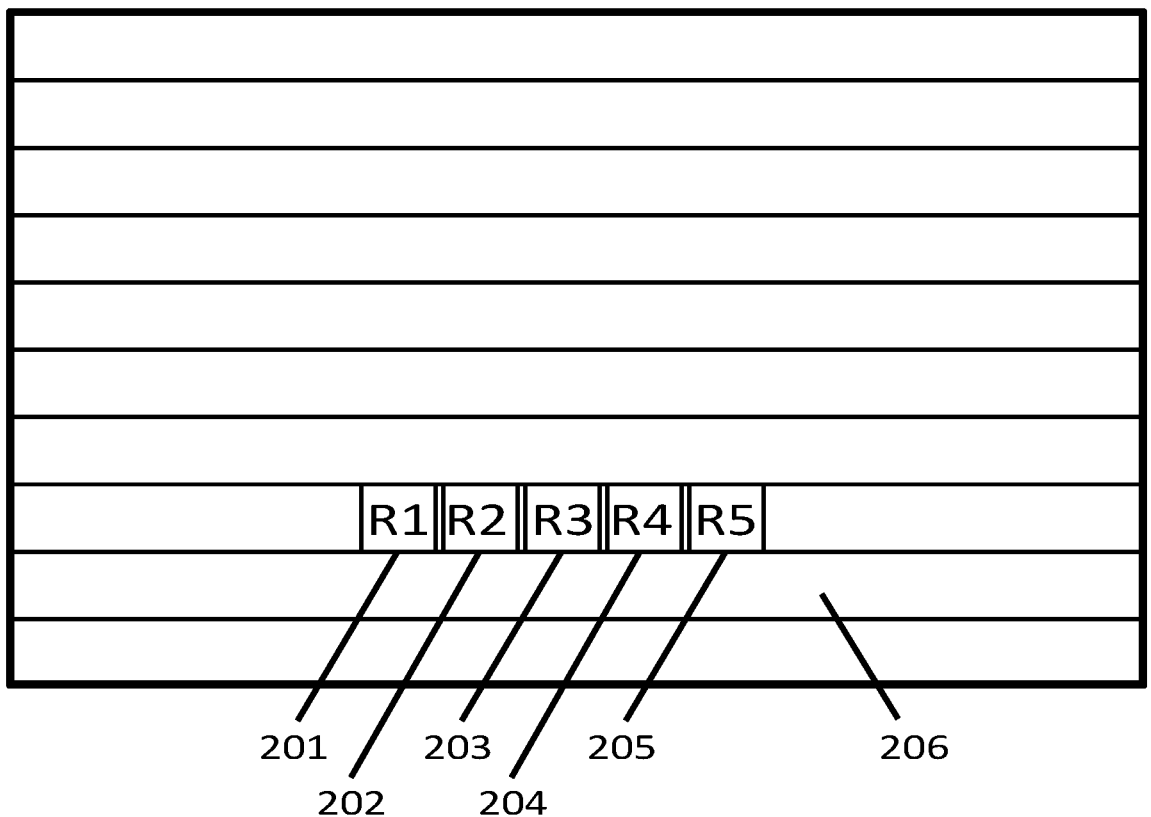
FIG. 2 is a diagram showing an example layout of reference plots in a non-irrigated field of row crops.

In this preferred embodiment, the nitrogen fertilizer application is split into a pre-plant or at-planting treatment (which we will just call the pre-plant treatment for simplicity) and a single, mid-season, sidedress treatment. The pre-plant treatment is designed so that a single, fixed rate is applied to the entire zone, except for a collection of small reference plots. An example arrangement of such a field is given in FIG. 2. In this preferred embodiment, five reference plots are used, which we will refer to as R1 [201], R2 [202], R3 [203], R4 [204], and R5 [205]. The area of the zone that is not in a reference plot will be called the bulk area [206]. The sizes of the reference plots are made small enough that collectively they constitute 1% or less of the area being managed. The placement of the reference plots within the field is important; they should be placed in a location that is representative of the majority of the bulk area. In particular, they should not be placed in areas that are prone to flooding or unusually high soil compaction. It is recommended that the precise locations of the reference plots be recorded and, if aerial or satellite-based remote sensing is to be used, they should be clearly marked visibly so as to be easily identifiable in imagery. In this preferred embodiment, the bulk area receives 80 lbs N/acre in the pre-plant treatment. Also in the pre-plant treatment, plot R1 receives 0 lbs N/acre, plot R2 receives 40 lbs N/acre, plot R3 receives 120 lbs N/acre, plot R4 receives 160 lbs N/acre, and plot R5 receives 360 lbs N/acre. The number of reference plots and the rates used in these plots or the bulk area can be adjusted. The important qualities are as follows. The bulk area should receive enough fertilizer so that the plant can get at least to growth stage V8 (where there are 8 fully emerged leaves on each plant) without requiring additional nutrient fertilizer, but the rate should be low enough that there is a high likelihood of additional fertilizer being needed before maturity. The rates in the reference plots should cover a wide range of values, including one very low rate (close to 0) and one rate that is high enough to ensure that nitrogen is non-limiting in that plot throughout the season (while this is advisable, what is essential is that the rate be non-limiting at the time of sidedressing). Ideally, at least two plots should have rates that are substantially lower than the rate used in the bulk area.

Figure 3:
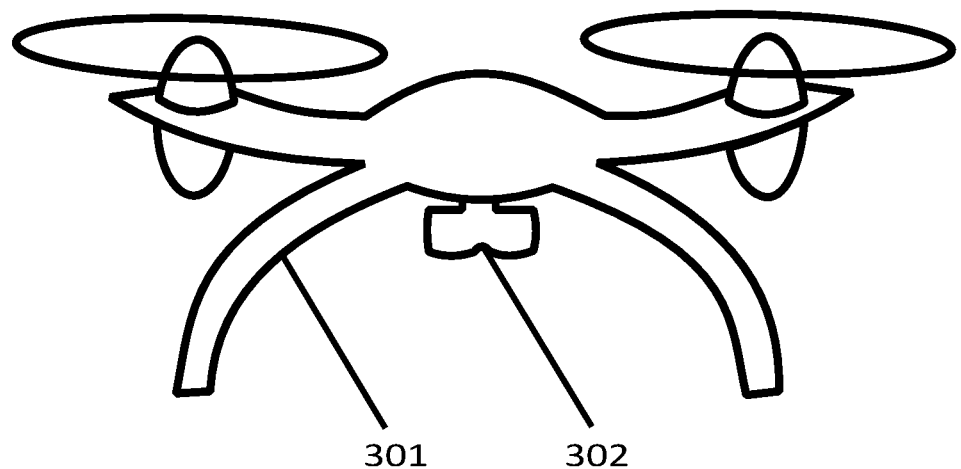
FIG. 3 shows a drone equipped with a multi-spectral camera used for measuring canopy reflectance in reference plots and a bulk area of a field.

After planting and applying the initial nitrogen treatment, the field is monitored. In particular, VI measurements are taken periodically from the reference plots and the bulk area in the field. These measurements are used to estimate the IRTN function and compute the CLR. While the CLR is below the bulk rate, the bulk of the field is not limited by nitrogen. Ideally, the field will continue to be monitored until the CLR increases to a point that is close to (but still less than) the pre-plant bulk rate. By this time stress should be visible in the low rate reference plots R1 [201] and R2 [202]. Once that occurs, a sequence of equations (presented below) is used to predict the YRTN function for the field and (optionally) the predicted profit for each possible nitrogen rate. The rate that is predicted to maximize profit, or the predicted max yield rate (if maximizing yield is the objective) will be called the target nitrogen rate. There are two main options for designing the sidedress treatment. The first option is to uniformly apply the difference between the target rate and the pre-plant rate applied in the bulk area. This will bring the cumulative rate in the entire field up to the target rate. This is the preferred approach when using a sensing technology that does not enable mapping the VI throughout the entire managed area (for instance, if using handheld sensors). The second option is to map out the VI over the field and make adjustments to the sidedress rate to account for variability within the field (using variable-rate application equipment). This is the preferred option when the sensing technology permits mapping the VI over large areas. This is the case when using aerial manned or unmanned vehicles equipped with standard, multi-spectral, or hyper-spectral cameras, or when using satellite-based imagery. In particular, FIG. 3 shows an unmanned quadcopter vehicle [301] equipped with a multi-spectral camera [302] for VI mapping.

We note that this preferred embodiment, when used to maximize profit, may be viewed as an innovative advancement over the MRTN method. It uses the historical average YRTN curve as an initial guess of the YRTN function for the given field and season. It then uses in-season VI measurements from the reference plots to revise and improve this curve to compensate for seasonal and locational variability. This revised YRTN curve is then used to estimate the nutrient rate that will maximize profit, and it is done early enough in a growing season that the estimated nutrient rate can be used to design a mid-season treatment that brings a field up to this target rate (and optionally accounts for additional within-field variability).

We now present the mid-season details of this preferred embodiment. Assume that after a specific assessment of the field it is observed that the CLR is between 40 and 80 lbs N/acre. A determination is made that it is time to prepare and execute the sidedress treatment. To compute the target rate, this preferred embodiment begins by estimating d, the number of days between the last date of sensing and the expected date at which the crop will begin to tassel. This will generally be a positive number, but it is possible to apply the sidedress after tasseling, in which case this will be a negative number. Let CLR denote the estimated Current Limiting Rate for nitrogen based on the VI measurements from the reference plots and bulk area on the last date of sensing. Let $C_N$ denote the expected cost of nitrogen fertilizer (in \$/lb N), and let $P_c$ denote the expected sale price of harvested corn (in \$/bu). Let $Y_{max_0}$ denote the expected yield potential for the field. This can be computed by taking the maximum field-average yield over the last several years in which corn was grown. Let $Y_{min_0}$ denote the expected yield with no applied nitrogen (in bu/acre). Ideally, this will be estimated based on yield measurements from 0-rate test plots in previous seasons, but it can also be estimated by the grower. If a reasonable estimate is not available, this preferred embodiment estimates this value based on soil organic matter content as follows (Let OM denote the percent soil organic matter in the range 0 to 100):

$$Y_{min_0} = \min(100, 14.35*OM + 2.91) \quad (4)$$

Next, define $N_{MaxYield}$ as follows:

$$N_{MaxYield} = CLR + 0.47*Y_{max_0} + 2.35*d \quad (5)$$

$N_{MaxYield}$ is a prediction of the max yield rate (in lbs N/acre) for the field for the given growing season. If the objective is to apply the lowest rate that maximizes yield, $N_{MaxYield}$ can be taken as the target rate. However, if the objective is to maximize profit, the target rate is computed as follows. A reasonable prior YRTN function is identified (for example, the historical average YRTN function from the MRTN database for the region). In this preferred embodiment, this function is stretched and shifted vertically so that at a Nutrient rate of 0 it achieves output $Y_{min_0}$ and it achieves maximum value $Y_{max_0}$. The domain is then scaled so that the function plateaus at nitrogen rate $N_{MaxYield}$. We will refer to the resulting function as $Y'(N_r)$. The predicted profit function is:

$$P'(N_r) = Y'(N_r)P_c - N_r C_N \quad (6)$$

If the objective is maximizing profit, the target rate is taken to be the maximizer of the function $P'(N_r)$. Let $N_{Target}$ denote the target nitrogen rate, computed in one of the two ways previously described, depending on the growers objective (maximizing yield or maximizing profit).

When a VI map is available for the field and a grower wishes to make a variable-rate prescription to account for variability within the field, the adjustment is made as follows in this preferred embodiment. Let x denote the VI measurement for a given location. If x is near or above the max VI achieved in the reference plots then, as with the previous method, the sidedress application rate is defined to be $N_{Target}$ minus the pre-plant rate. If x is significantly below the max VI achieved in the reference plots, then the inverse of the IRTN function is used to compute the "Effective N rate" for the location. That is:

$$\text{Effective } N \text{ Rate} = IRTN^{-1}(x) \quad (7)$$

This is the N rate that is consistent with the appearance of the crop in the given location. The sidedress application rate for the given location is computed as follows:

$$\text{Sidedress } N \text{ Rate} = N_{Target} - \text{Effective } N \text{ Rate} \quad (8)$$

Figure 4:
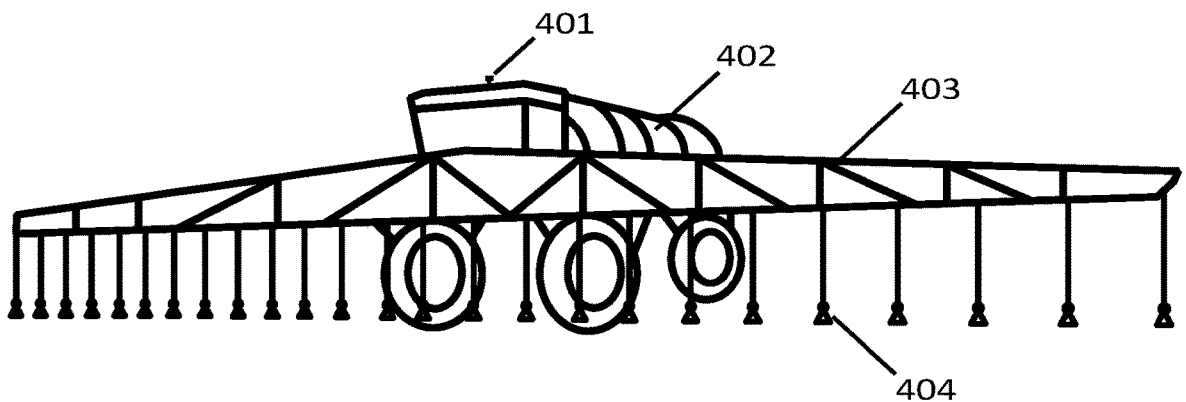
FIG. 4 shows a high-clearance, self-propelled sprayer for executing a variable-rate, mid-season fertilizer application in row crops.

In an area that is subject to parasitic nitrogen loss above that experienced in the reference plots, the effective rate will be less than the pre-plant bulk rate, and the sidedress rate will be increased to replenish the lost nitrogen. Executing this strategy requires the use of variable-rate application equipment. Additionally, since the sidedress treatment in this embodiment may occur once the crop is relatively tall (4 feet or higher), high-clearance equipment may be needed. FIG. 4 shows a high-clearance, self-propelled sprayer that is ideally suited for use in this preferred embodiment. A nutrient tank [402] is attached to an elevated chassis that is designed to drive over medium height, or fully mature corn without damaging it. A boom [403] is mounted to the front of the vehicle equipped with a sequence of drop hoses [404] to deliver liquid fertilizer from the tank [402] in between each consecutive pair of corn rows. A precise Global Navigation Satellite System (GNSS) receiver [401] is used to ensure that the prescribed amount of fertilizer is applied at each location in the managed area.

Regardless of whether a fixed-rate or variable-rate sidedress is selected, it is recommended that the reference plots not be included in the treatment. This can be achieved by setting the sidedress rate to 0 in these areas in a variable-rate prescription, or by manually turning off the applicator when driving over the reference plots. This ensures that yield measurements from the reference plots can be used at the end of the season to compute the true YRTN curve and to compute the true EONR. These can inform decisions for the next season and they can also be used in evaluating the performance of the sidedress treatment computed in this embodiment.

The flowchart in FIG. 1 provides a more detailed outline of this preferred embodiment, including how to handle edge cases such as a field that is not responding to nitrogen, or a field in which the reference plots are damaged. In particular, the initial nitrogen treatment is applied in the bulk area and reference plots, as described earlier. A contingency plan is also prepared for the field in the event that sensing-based management needs to be abandoned for the given field and season (for instance, if the reference plots are damaged). After planting, the field is periodically monitored until approximately growth stage V8. During this period of time, no intervention relating to nitrogen management is expected unless unique circumstances arise (such as flooding or re-planting). Once the crop reaches approximately growth stage V8 the main tasks of this embodiment begin [101].

The reference plots are inspected [102]. VI measurements are made on each of the reference plots and the IRTN function is estimated. An assessment is made as to whether the field is showing a response to Nitrogen. In particular, if there is no significant difference in appearance and VI readings between the different reference plots, the field is deemed non-responsive. Otherwise it is deemed responsive.

If the field is non-responsive, another assessment is made to determine whether the reference plots appear healthy [103]. If the plants in these plots appear typical for plants at their growth stage and are not showing signs of stress, then the reference plots are deemed to be healthy. Otherwise, they are deemed to be unhealthy.

If the reference plots are unhealthy, a conclusion is made that some other factors are limiting growth in the field [105]. Factors may include pests, disease, drought, flooding, or limitation due to other nutrient deficiencies. These factors are likely to interfere with the crops nitrogen response and sensing-based management should be abandoned for this field and season. The field contingency plan is executed.

If, on the other hand, the reference plots appear healthy, then their unresponsiveness is not necessarily an indicator of problems. Reflectance data is collected [106] from multiple locations in the bulk area and VI values are computed. From these VI values, a determination is made about whether significant signs of stress are visible in a large portion of the bulk area [108]. If such stress is found, it is an indication that the reference plots are not representative of the majority of the bulk area (due to, for instance, damage to the reference plots) and the field contingency plan is executed [110].

If, upon this inspection, it is determined that the bulk area is not subject to significant stress, the ideal course of action is to continue monitoring the field. The most likely condition in this scenario is that there is so much available nitrogen in the soil that nitrogen is not a limiting factor for growth anywhere in the managed area (including in the low-rate reference plots). However, depending on the maturity of the crop and access to equipment, a grower may be forced to make an early decision about sidedressing at this time. A determination is made about whether it will be possible to apply a sidedress treatment if they wait 1 week [109]. If it is possible to apply a mid-season treatment in 1 weeks' time, they will wait 1 week [111]. Next, the crops growth stage is assessed [112]. If the crop has reached growth stage R1 (the first reproductive stage for corn) the sidedress treatment is skipped [114]. If, after waiting 1 week, the crop has not reached R1, then the grower returns to the step of inspecting the reference plots [102].

On the other hand, if it is determined that waiting 1 week makes sidedressing impossible, a decision must be made as to whether or not to sidedress now. Without seeing a response in the reference plots and without seeing stress in the bulk area, it is not possible to accurately assess the proper amount of nitrogen to apply in each area in the field based on measured VI values. Instead, the decision is between a uniform sidedress treatment, and skipping the treatment. This decision is based on the approximate height of the crop. Specifically, it is determined whether the crop is taller than approximately 5 ft (chest height) [113]. If the crop has reached this height without showing a response to nitrogen, it is likely that the crop will make it to maturity without depleting the supply of nitrogen already available to it. After all, the bulk area has 80 lbs N/acre more than reference plot R1 [201], which is showing no stress. Thus, the sidedress treatment is skipped [114]. If, on the other hand, the crop is below approximately 5 ft, then it is still possible that the currently non-responsive field will develop a response to nitrogen later in the season, at a time when sidedressing is no longer possible. A uniform sidedress is applied [115] at a rate of 40 lbs N/acre as a way of mitigating the risk posed by this possibility.

The above tasks pertain mostly to contingency plans for non-responsive fields. If, upon inspecting the reference plots, it is determined that the field is responsive (in a typical field this will eventually be the case), reflectance data is collected for the bulk area and VIs are computed [104]. Using the procedure detailed earlier in the description of this preferred embodiment (in particular using equation (5), and optionally (4), (6), (7) and (8), depending on the objective, available information, and equipment), a sidedress treatment is prepared and executed [107].

Figure 5:
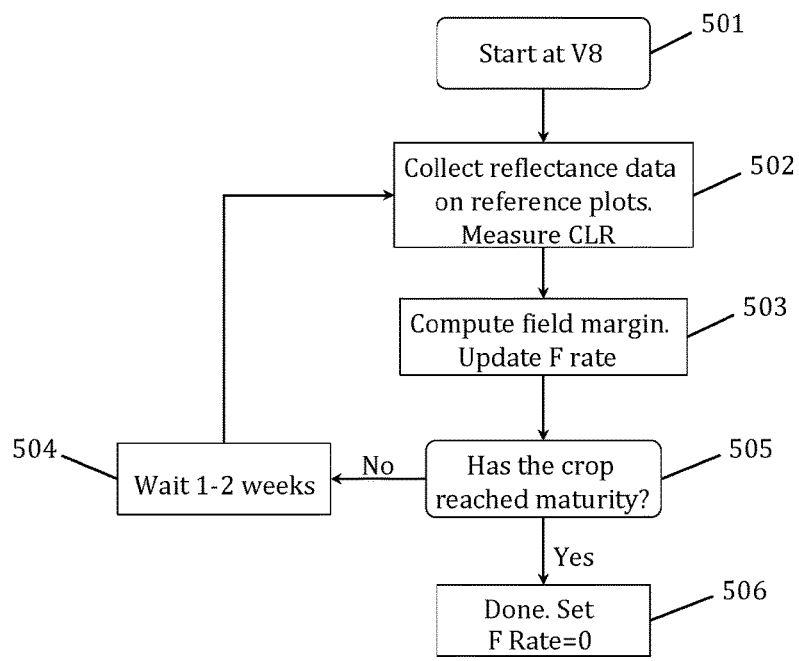
FIG. 5 is a flowchart illustrating the preferred embodiment of the invention for managing nitrogen in irrigated corn.

A Preferred Embodiment for Nitrogen Management to Maximize Yield in Irrigated Corn The arrangement in FIG. 5 illustrates a preferred embodiment of this invention specialized for managing nitrogen in corn using several mid-season applications (in addition to the fertilizer applied at or before planting). This is the preferred approach for managing nitrogen in irrigated corn, where nitrogen fertilizer can be easily and affordably applied through irrigation equipment. This embodiment can be used with drip line, center pivot, linear track, or other types of irrigation systems, and it is applied to a single irrigation zone. Different irrigation zones can use the same process, but they should be managed separately.

The aim of this embodiment is to determine the amount of nitrogen fertilizer to apply to the zone through the irrigation system per unit time. This will be called the fertigation rate and will be specified in lbs N/acre/week. In this embodiment, it is assumed that nutrients that are added mid-season will be applied uniformly to the managed area through the irrigation system, although if variable rate application is possible, simple modifications can be made to exploit that capability (following the description of the previous preferred embodiment). This methodology makes no recommendations regarding when a zone should be irrigated or how much water should be applied during irrigation; those decisions must be made separately. A grower should add fertilizer doses when they irrigate so that on average they are achieving the targeted fertigation rate. For example, if a grower decides not to irrigate for a period of one week, they can apply double the target rate in the following week to compensate. This way, on average they are applying the targeted amount per acre per week.

The objective of this preferred embodiment is to apply as little nitrogen fertilizer as possible, while ensuring that the crops growth or health is never limited by nitrogen. This is not an economics-based objective, and so fertilizer cost and product price are not relevant. This embodiment can be easily modified, however, so that the objective is to maximize grower profit. See the description of the next preferred embodiment for details on these modifications.

Figure 6:
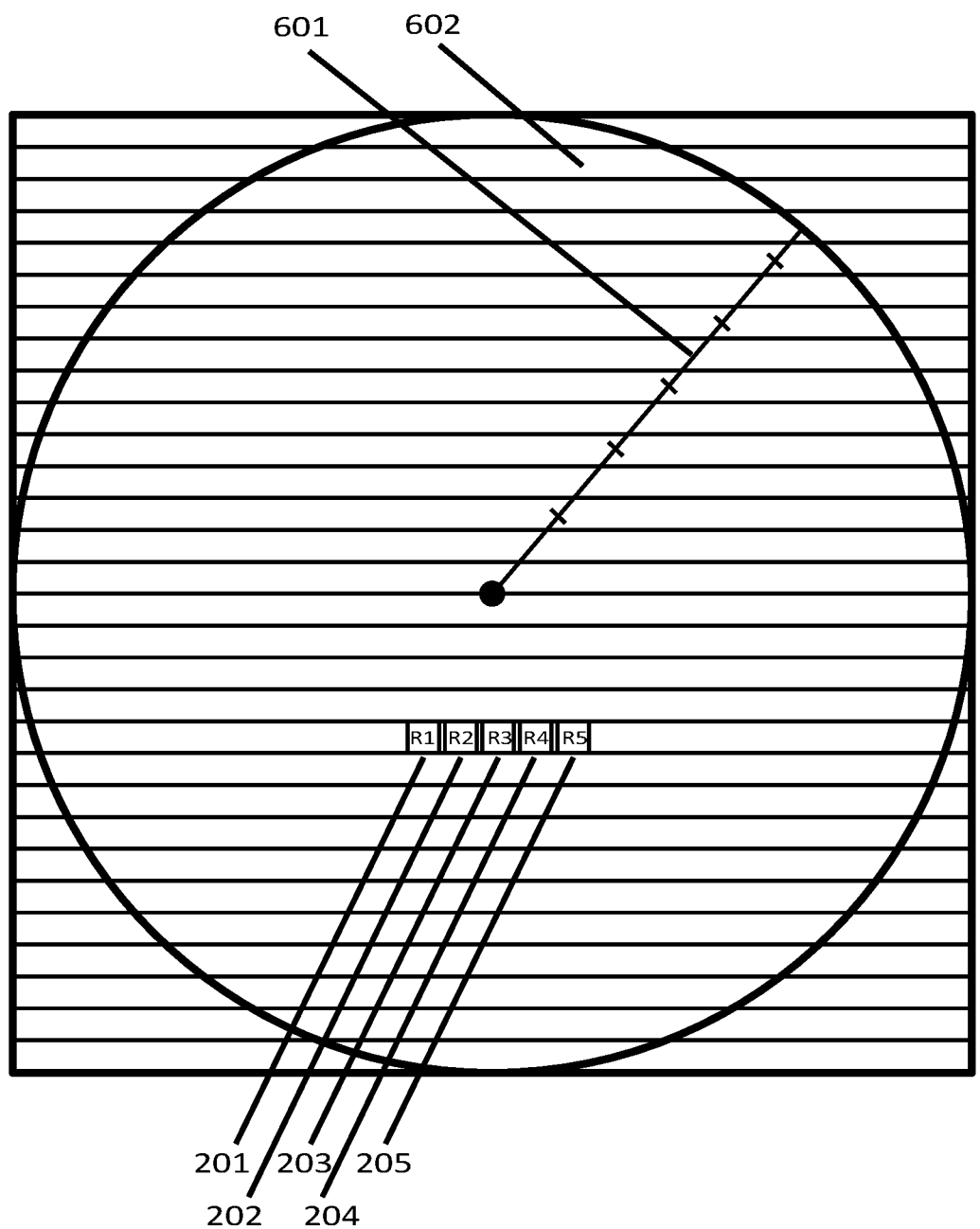
FIG. 6 is a diagram showing an example layout of reference plots in an irrigated field of row crops.

At or before planting, the zone being managed will receive an initial fertilizer application. Most of the zone will receive a single rate, called the base N rate. A collection of reference plots will be set aside and fertilized at rates that are different from this base rate. An example layout for such a field is shown in FIG. 6, equipped with a center pivot irrigation system [601]. The base rate applied to the bulk area [206] should be high enough that the crop can at least reach vegetation growth stage V8 (where there are 8 fully emerged leaves on each plant) without having its growth limited by nitrogen. It should also be low enough that there is a high likelihood of the field requiring additional fertilizer at some point in the season. A reasonable base rate is 80 lbs N/acre, although this can be adjusted up or down depending on circumstances and other nutrients being applied.

In this preferred embodiment, five reference plots are used, which will be referred to as R1 [201], R2 [202], R3 [203], R4 [204], and R5 [205]. Plot R1 is not initially given any nitrogen fertilizer. Plot R2 is given one fourth the base rate. Plot R3 is given half the base rate. Plot R4 is given three quarters the base rate. Plot R5 is given double the base rate.

Between emergence and growth stage V8, the fertigation rate is set to 0 lbs N/acre/week. At approximately growth stage V8, VI measurements are made on the reference plots and a representative region of the bulk area of the zone (the area that received the base rate). The IRTN function is computed, and the CLR is estimated. The difference between the base rate and the CLR is computed. This difference will be called the margin. That is:

$$\text{Margin} = \text{Base Rate} - \text{CLR} \quad (9)$$

The fertigation rate (F rate), in lbs N/acre/week, is computed from the margin as follows:

$$F \text{ Rate} = \min(\max(16.5 - 0.4 * \text{Margin}, 0), 40) \quad (10)$$

After the first assessment, the field is reexamined every one to two weeks and the F rate is updated. After the initial assessment nutrients may be added through the irrigation system, which increases the cumulative rate in each area of the zone. That is, the bulk area and each reference plot will have received some additional amount, $N_A$, of nitrogen per acre since the pre-plant or at-plant treatment. Observe that the entire zone receives the same additional amount, $N_A$ lbs N/acre. In a follow-up assessment, when estimating the IRTN function, the cumulative rates for the bulk area and each reference plot should be used (that is, including the $N_A$ lbs N/acre applied so far mid-season). The margin is computed by taking the cumulative rate applied in the bulk area and subtracting the CLR. Then, equation (10) is used to update the F rate. Follow-up assessments occur until the plant reaches maturity, after which no additional fertilizer should be added.

This embodiment has a very important property: error cancellation. Assume that $N_A$ is not known precisely. That is, assume our estimate, which we will call $\hat{N}_A$ is in error by some amount E. Specifically, let $\hat{N}_A = N_A + E$. The error shifts all data points used to fit the IRTN function right by an amount E. Using any sensible curve fitting scheme, this will shift the IRTN function right by E, and the CLR will increase by E. Furthermore, our estimate of the cumulative rate applied to the bulk area is also increased by E. Thus, the error cancels out when computing the margin. This means that any error in keeping track of nutrients applied since planting is completely canceled out and has no impact on future updates to the F rate.

An extension of this property is that we can deliberately neglect any post-planting fertilization when computing the margin and the F rate (that is, we can assume $N_A = 0$). This has no impact on the computation of the F rate. This is an important property since careful records of all mid-season application may not always be available, and even if they are kept, needing to produce them each time the F rate is updated would be an unneeded burden and a possible source of error.

Initially, since the CLR is 0 at planting, the margin for the zone equals the base rate. This methodology and equation (10) are designed to drive the margin for the zone downward to 0 by maturity. If this goal is achieved, the bulk area of the zone will be right on the threshold of being nitrogen limited, and it will not have been limited by nitrogen at any point in the season.

Equation (10) represents a linear feedback control law for controlling the margin of a zone. The max and min are used to establish reasonable limits on the fertigation rate. These are especially important for situations in which the reference plots may be damaged or otherwise non-representative of the zone, or in cases where errors were made in applying the initial treatments to the plots. The coefficients in (10) were tuned based on corn nutrient trials, but different coefficients, different bounds, or even another function form could be used to achieve the same result.

The flowchart in FIG. 5 provides a visual depiction of this preferred embodiment. After planting and applying the initial treatment, the field is monitored until approximately V8. During this period of time the F rate is set to 0, and no intervention relating to nitrogen management is expected unless unique circumstances arise (such as flooding or re-planting). Once the crop reaches approximately growth stage V8 the main tasks of this embodiment begin [501].

Reflectance data is collected on the reference plots and a representative region of the bulk area and VI values are computed. An IRTN function is estimated and the CLR is computed [502]. The field margin is computed, and equation (10) is used to update the Fertigation rate [503].

Sensing and updates to the F rate should occur periodically until the crop reaches maturity. Thus, after each update a determination is made as to whether the crop is mature [505]. If the crop is mature, fertigation is complete and the F rate is set to 0 for the remainder of the season [506]. If the crop is not mature, one waits 1 to 2 weeks [504] before sensing the reference plots again [502] and repeating the process.

Throughout the season, a grower will periodically irrigate. Each time they irrigate a nitrogen dose should be added so that the weekly average of added nitrogen approximately equals the F rate. For instance, if a grower plans to irrigate 2 times a week, on average, they should add half the F rate in each session. It is advised that the grower not go more than 1-2 weeks without irrigating, even if the precipitation patterns would allow it. This ensures that the added nitrogen does not stray too far from the prescribed amount.

In this preferred embodiment it is important to address the proper action to take if prescribed doses are missed or if a growers application falls behind the prescribed weekly averages for some reason. While it would seem reasonable to add more than the prescribed nitrogen in later doses to make up for the unapplied amount, this should not be done. The feedback control strategy employed in this embodiment will naturally compensate for unapplied fertilizer and increase subsequent F rate estimates accordingly. Thus, if doses are missed, the only corrective action that should be taken is that efforts should be made to apply close to the prescribed F rate going forward into the remainder of the season.

A Preferred Embodiment for Nitrogen Management to Maximize Profit in Irrigated Corn This preferred embodiment is a modification to the previous preferred embodiment for irrigated corn to change the objective from applying the lowest cumulative rate that maximizes yield to applying the cumulative rate that maximizes profit. This embodiment can also be used with drip line, center pivot, linear track, or other types of irrigation systems, and it is applied to a single irrigation zone. Different irrigation zones can use the same process, but they should be managed separately.

In this preferred embodiment, a reasonable prior YRTN function is identified (for example, the historical average YRTN function from the MRTN database for the region). The yield potential, $Y_{max_0}$, and the expected yield at no applied nitrogen, $Y_{min_0}$, are estimated. These quantities are estimated as described in the preferred embodiment for non-irrigated corn (in particular, see equation (4)). In this preferred embodiment, the prior YRTN function is stretched and shifted vertically so that at a Nutrient rate of 0 it achieves output $Y_{min_0}$ and it achieves maximum value $Y_{max_0}$. We will refer to the resulting function as $Y_{Hist}(N_r)$.

Next, let $C_N$ denote the expected cost of nitrogen fertilizer (in \$/lb N), and let $P_c$ denote the expected sale price of harvested corn (in \$/bu). The predicted profit function is:

$$P(N_r) = Y_{Hist}(N_r)P_c - N_r C_N \quad (11)$$

Two rates are then computed. First, let $N_{HistMaxYield}$ be the lowest nitrogen rate for which the function $Y_{Hist}(N_r)$ achieves its maximum value. Second, let $N_{HistEONR}$ be the input, $N_r$, that maximizes predicted profit $P(N_r)$ in equation (11). The difference between these values will be referred to as the "Target Deficit":

$$\text{Target Deficit} = N_{HistMaxYield} - N_{HistEONR} \quad (12)$$

In this preferred embodiment, the coefficients in equation (10) are adjusted so that instead of driving the margin to 0, the margin is driven towards −1 times the target deficit. The intent of this modification is to make the managed area just slightly nitrogen deficient by the end of the season. The amount by which the crop is deficient, under this embodiment, is designed to approximately maximize profit.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

What is claimed is:

1. A method for applying a mid-season fertilizer application to a managed area within a field containing a crop, comprising:
   a) creating reference plots with different, known, pre-plant nutrient rates, including at least 1 plot fertilized at a lower rate than a majority of the managed area;
   b) estimating yield at a specified, low nutrient rate;
   c) estimating yield at a high, non-limiting nutrient rate;
   d) measuring a sensor-based reading of crop health or vigor in the reference plots created in (a) and elsewhere in the managed area using a handheld crop health sensor or chlorophyll meter, aircraft-mounted d standard, multi-spectral, or hyper-spectral camera, satellite-based optical imaging device, or a vegetation index derived from any of these sources, or other sensor capable of measuring crop health or vigor;
   e) using the measurements from (d) to estimate a Current Limiting Rate (CLR) for the nutrient;
   f) using the CLR estimate from (e) and a model for movement of the CLR with time for the crop to predict a Yield Response To Nutrient (YRTN) function;
   g) using the predicted YRTN function from (f) to estimate a nutrient rate that achieves a yield-related or profit-related objective;
   h) using the nutrient rate computed in (g) to design one or more mid-season nutrient treatments;
   i) setting a variable-rate sprayer or other variable-rate fertilizer application equipment to execute the one or more mid-season nutrient treatments in the managed area; and
   j) causing the variable-rate sprayer or other variable-rate fertilizer application equipment to execute the one or more mid-season nutrient treatments in the managed area.

2. The method of claim 1 wherein step (b) uses a yield measurement from a 0-rate or low-rate test plot in the field or a nearby field in a previous year or an average of such measurements over multiple years as the estimate of yield at a specified, low nutrient rate.

3. The method of claim 1 wherein step (b) includes:
   i. looking up an estimate of soil organic matter (OM) content for the managed area in a soil database or measuring soil OM content with soil testing; and
   ii. using the soil OM content from (i) to estimate the yield for the specified, low nutrient rate.

4. The method of claim 1 wherein step (c) uses an average yield for the field in a previous growing season, or an average or maximum of average yields for multiple previous growing seasons as the estimate of yield at a high, non-limiting rate nutrient rate.

5. The method of claim 1 wherein step (c) uses Yield Response To Nutrient curves from a database of nutrient trials to lookup the yield corresponding to a high, non-limiting nutrient rate.

6. The method of claim 1 wherein step (e) uses a quadratic plateau function as a model for an Index Response To Nutrient (IRTN) function, fits the IRTN function by minimizing $l_1$ error, Mean Square Error, or Weighted Mean Square Error on the measurements from step (d), and computes the CLR as the plateau of the IRTN function.

7. The method of claim 1 wherein step (f) uses a quadratic plateau function or an initial function from a database of nutrient trials, along with the estimates from (b) and (c) to define an initial estimate of the YRTN function, and adjusts this initial estimate to compute the predicted YRTN function.

8. The method of claim 7 wherein the model for the movement of the CLR with time is used to predict an input at which the YRTN function plateaus and wherein the adjustment made to the initial YRTN function is shifting the domain, scaling the domain, or a combination of shifting and scaling the domain of the initial estimate of the YRTN function so that the YRTN function plateaus at this input.

9. The method of claim 8 wherein the model for the movement of the CLR with time is a linear function in which the CLR is expected to increase a certain amount per day or per growing degree day.

10. The method of claim 1 wherein step (g) the nutrient rate is computed to achieve maximum profit, or is computed as the lowest nutrient rate that will maximize yield.

11. The method of claim 1 where in step (h) one or more, uniform, mid-season treatment(s) is/are computed so that the season-total applied nutrient rate for the managed area, excluding the reference plots, equals the rate computed in step (g).

12. The method of claim 1 wherein step (h) includes:
  i. measuring the sensor-based reading of crop health or vigor in each location in the managed area;
  ii. computing an effective nutrient rate for each location by inverting a function fit to the measurements made in (d); and
  iii. computing the mid-season fertilizer application rate by subtracting the effective nutrient rate from (ii) from the target nutrient rate from (g) at each location.

13. A method for periodically applying a mid-season fertilizer application to an irrigation zone in a field containing a crop, comprising:
  a) creating reference plots with different, known, pre-plant nutrient rates, including at least 1 plot fertilized at a lower rate than a majority of the irrigation zone;
  b) measuring a sensor-based reading of crop health or vigor in the reference plots created in (a) and elsewhere in the irrigation zone using a handheld crop health sensor or chlorophyll meter, aircraft-mounted standard, multi-spectral, or hyper-spectral camera, satellite-based optical imaging device, or a vegetation index derived from any of these sources, or other sensor capable of measuring crop health or vigor;
  c) using the measurements from (b) to estimate a Current Limiting Rate (CLR) for the nutrient;
  d) using the CLR estimate from (c) and a model for movement of the CLR with time for the crop to compute a fertigation rate that will keep the field margin, defined as the cumulative applied nutrient rate for the area outside the reference plots minus the CLR, above a chosen value for a predetermined amount of time, for instance the time between planned sensing events;
  e) causing fertilizer doses to be added to an irrigation system to apply fertilizer in the irrigation zone according to the fertigation rate;
  f) causing the irrigation system to apply fertilizer in the irrigation zone according to the fertigation rate; and
  f) repeating steps (b), (c), (d), (e), and (f) multiple times until the crop reaches maturity.

14. The method of claim 13 wherein step (c) uses a quadratic plateau function as a model for an Index Response To Nutrient (IRTN) function, fits the IRTN function by minimizing $l_1$ error, Mean Square Error, or Weighted Mean Square Error on the measurements from step (b), and computes the CLR as the plateau of the IRTN function.

15. The method of claim 13 wherein step (d) computes the fertigation rate to achieve the objective that the field Margin approximately equals O as the crop reaches maturity.

16. The method of claim 13 wherein step (d) computes the fertigation rate to achieve the objective that when the crop reaches maturity, the field Margin is negative by an amount computed to approximately maximize profit in the majority of the irrigation zone.

\* \* \* \* \*